United States Patent
Morris et al.

(10) Patent No.: US 8,214,601 B2
(45) Date of Patent: Jul. 3, 2012

(54) PURGING WITHOUT WRITE-BACK OF CACHE LINES CONTAINING SPENT DATA

(75) Inventors: Dale Morris, Steamboat Springs, CO (US); Robert S. Schreiber, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1796 days.

(21) Appl. No.: 10/909,057

(22) Filed: Jul. 30, 2004

(65) Prior Publication Data

US 2006/0026360 A1 Feb. 2, 2006

(51) Int. Cl.
*G06F 12/00* (2006.01)
*G06F 13/00* (2006.01)
*G06F 13/28* (2006.01)

(52) U.S. Cl. ........ 711/144; 711/133; 711/134; 711/135; 711/143; 711/145

(58) Field of Classification Search .......... 711/133–135, 711/143–144
See application file for complete search history.

(56) References Cited

U.S. PATENT DOCUMENTS

| | | | | |
|---|---|---|---|---|
| 5,623,633 A | * | 4/1997 | Zeller et al. | 711/146 |
| 5,684,977 A | * | 11/1997 | Van Loo et al. | 711/143 |
| 5,838,962 A | | 11/1998 | Larson | |
| 6,237,065 B1 | * | 5/2001 | Banerjia et al. | 711/133 |
| 6,349,365 B1 | * | 2/2002 | McBride | 711/133 |
| 6,886,085 B1 | * | 4/2005 | Shuf et al. | 711/159 |
| 2002/0087765 A1 | | 7/2002 | Kumar et al. | |
| 2004/0093462 A1 | | 5/2004 | Roth et al. | |
| 2005/0273563 A1 | * | 12/2005 | Kim et al. | 711/143 |

* cited by examiner

*Primary Examiner* — Yaima Campos

(57) ABSTRACT

The present invention provides a system with a cache that indicates which, if any, of its sections contain data having spent status. The invention also provides a method for identifying cache sections containing data having spent status and then purging without writing back to main memory a cache line having at least one section containing data having spent status. The invention further provides a program that specifies a cache-line section containing data that is to acquire "spent" status. "Spent" data, herein, is useless modified or unmodified data that was formerly at least potentially useful data when it was written to a cache. "Purging" encompasses both invalidating and overwriting.

36 Claims, 3 Drawing Sheets

| LINE | STATUS |||||||||||||||
| --- | --- | --- | --- | --- | --- | --- | --- | --- | --- | --- | --- | --- | --- | --- | --- | --- |
| | SECTIONS |||||||||||||||
| | S1 |||| S2 |||| S3 |||| S4 ||||
| | V | M | D | S | V | M | D | S | V | M | D | S | V | M | D | S |
| L1 | + | + | − | + | + | + | − | + | + | + | − | + | + | + | − | + |
| L2 | − | | | | − | | | | − | | | | − | | | |
| L3 | + | + | − | + | + | + | − | + | + | + | − | + | − | | | |
| L4 | + | + | − | + | + | + | − | + | + | + | − | + | + | − | + | |
| L5 | + | + | − | + | + | + | − | + | + | + | | + | + | − | − | − |
| L6 | + | + | − | + | − | | | | + | − | + | | + | − | − | − |
| L7 | + | + | − | + | + | + | − | + | + | + | − | + | + | + | − | − |
| L8 | + | + | − | + | + | + | − | + | + | + | − | + | + | + | + | |

VALID
MODIFIED
DURABLE
SPENT

FIG. 3

PURGING WITHOUT WRITE-BACK OF CACHE LINES CONTAINING SPENT DATA

BACKGROUND OF THE INVENTION

The present invention relates to computers and, more particularly, to cache management. A major objective of the present invention is to enhance computer performance by eliminating some writes back of useless data to main memory.

Much of modern progress is associated with advances in computer technology. A computer system typically includes memory for storing data and program instructions and a processor for manipulating data in accordance with the program instructions. A typical processor contains many devices fabricated together on an integrated circuit so that they can communicate with each other at very high speeds. While a small amount of memory can reside with a processor on an integrated circuit, main memory is typically external. Accordingly, memory accesses can be a performance limiter for computers. This is particularly true for technical applications, in which processors are often starved for data from memory.

Caches are memory devices that hold copies of recently accessed sections of memory so that a processor can read some data from the cache instead of from memory. Very fast caches can be built into the same integrated circuit that bears the processor or on external circuits that are more closely coupled to the processor than is main memory. On-chip caches tend to be the fastest but have the most limited capacity. Off-chip caches tend to be larger and slower, while still offering a great speed advantage relative to main-memory accesses.

Caches can be used to speed up not only read operations but also write operations. It takes much less time to write to a cache location than to a main-memory location. However, data written to a cache location must, in general, be written to main memory; otherwise, cache and memory will not match, i.e., they will be "incoherent". Accordingly, some "write-through" caches copy data to main memory as soon as possible after it is written to cache.

However, other "write-back" (or "copy-back") caches achieve some performance advantage by delaying writes back to main memory until they are necessary. In a write-through cache, each modification of a cache line results in a separate write back to main memory; in a write-back cache, any intervening modifications can be included in a single write back. For example, a write-back cache can delay write back of a line until it is about to be replaced to make room for more recently fetched data. In this case, only one write back is required regardless of the number of modifications applied to the cache line.

This write-back strategy reduces memory accesses and improves performance not only when multiple writes are performed on the same cache line, but also in other circumstances. For example, when an external device writes directly to memory, that data should not be overwritten by data in the cache. Accordingly, a device driver can issue a purge instruction (e.g., as provided for by the PA-Risc architecture developed by Hewlett-Packard Company) for cache lines that correspond to those memory sections to be written to by the device. The purged data is never written back, saving the corresponding memory accesses. While the foregoing cache strategies have provided performance improvements, further performance gains are desired.

SUMMARY OF THE INVENTION

The present invention provides a system with a cache that indicates which, if any, of its sections contain data having spent status. The invention also provides a method for identifying cache sections containing data having spent status and then purging without writing back to main memory a cache line having at least one section containing data having spent status. The invention further provides a program that specifies a cache-line section containing data that is to acquire "spent" status. "Spent" data, herein, is useless modified or unmodified data that was formerly at least potentially useful data when it was written to a cache. "Purging" encompasses both invalidating and replacement. The invention, including some of its more specific aspects, is enabled by the description below with reference to the following drawings.

BRIEF DESCRIPTION OF THE DRAWINGS

The following figures depict a specific embodiment of the invention and are not depictions of the invention itself.

FIG. 3 is a schematic diagram of the status section of an alternative cache in accordance with the present invention for the system shown in FIG. 1.

DETAILED DESCRIPTION

Figure 1:
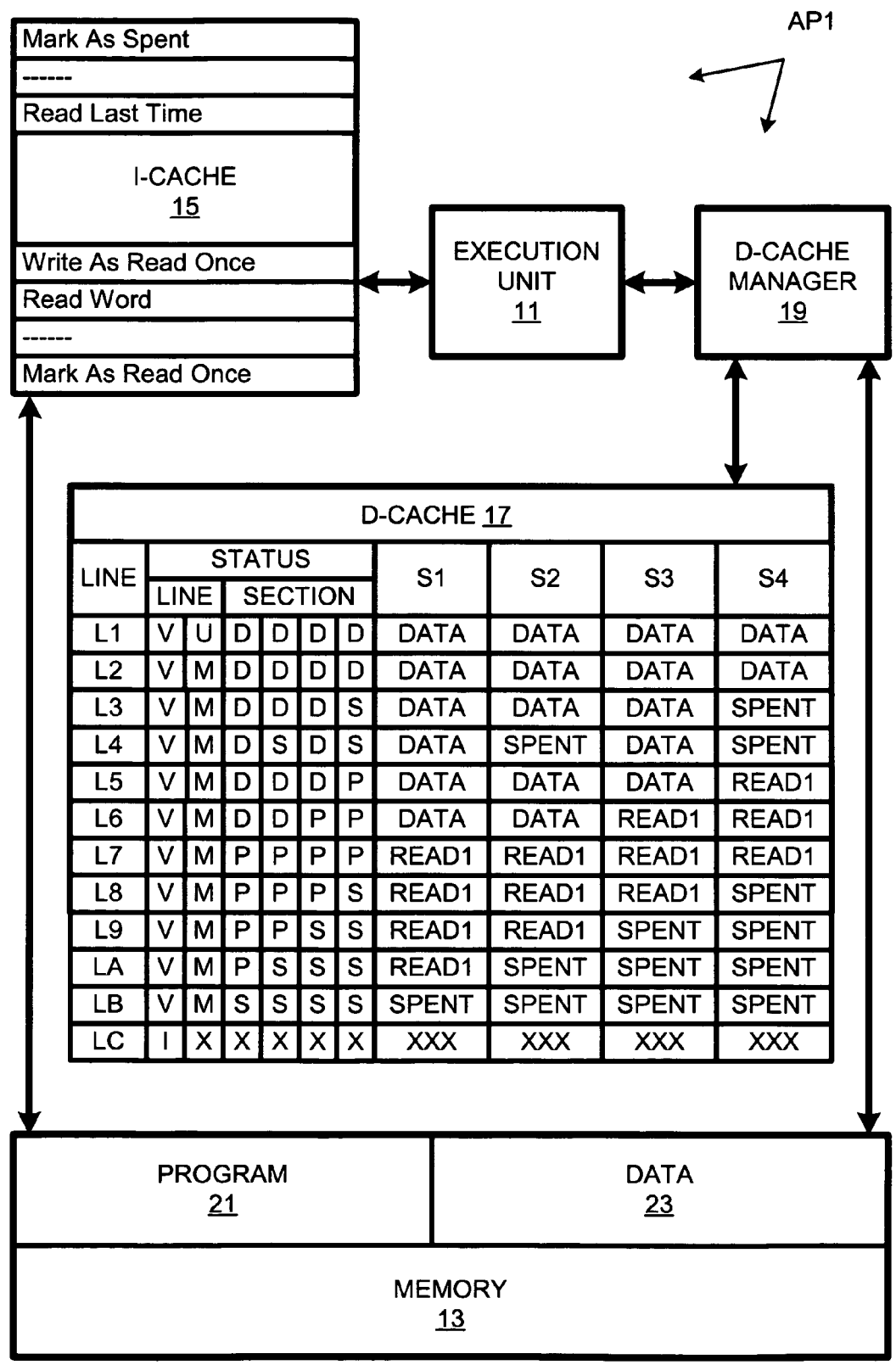
FIG. 1 is a schematic block diagram of a computer system in accordance with the present invention.

A computer system AP1 in accordance with the present invention comprises an execution unit 11, memory 13, an instruction cache 15, a data cache 17, and a data-cache manager 19. Memory 13 stores a program 21 and data 23, the latter to be manipulated in accordance with instructions of program 21.

Data cache 17 has twelve cache lines L1-LC; each cache line is sixteen bytes wide and is divided into four 32-bit sections. Alternative embodiments of the invention include data caches with different depths, widths, and numbers of sections. In fact, one of the advantages of the invention is that the programmer or compiler does not need advanced knowledge of cache structure or dimensions to achieve performance gains offered by the invention.

Data cache 17 has two status fields that describe the overall status for each cache line. The first "validity" status bit indicates whether the line contains valid (V) or invalid (I) data; the second "modified" status bit indicates whether the valid data is in its original unmodified form (U) and thus matches the copy in memory or has been modified (M) and thus differs from the copy in memory. In alternative embodiments, additional status fields can be used to indicate exclusiveness and sharing for multiprocessor embodiments.

The next four status fields in the illustrated embodiment apply to respective cache-line sections. Each of the section status fields indicates for the respective section whether the valid modified data it contains is durable (D), perishable (P), or spent (S). In cache 17, unmodified valid data is durable. Modified valid data can be durable, perishable, or spent. A cache line that contains modified durable or perishable data must be written back to memory before the cache line is purged (e.g., overwritten or marked invalid); a cache line containing only spent data is not written back before being purged.

During a conventional read operation addressed to a main memory location not represented in cache 17, a line of data is fetched from main memory and stored in cache 17. The cache line at which the data is stored is then marked valid (V) and unmodified (U), while each section is marked durable (D) by default, as shown for cache line L1 in FIG. 1. A read that can be satisfied from cache line L1 leaves the cache line status unmodified, while a conventional write to the same line would change the status from unmodified to modified, as shown for line L2. The status of line L2 can also be obtained when writing to a memory location not represented in cache; in that case, the contents of the memory location are copied to cache and then overwritten.

In accordance with the present invention, program 21 includes two types of novel instructions that result in cached data being marked "spent". Direct instructions cause data to be marked spent upon execution. The basic meaning is "mark as spent data in cache locations corresponding to the specified main-memory address range". The range can correspond to a single section, or any number of sections, even spanning multiple cache lines.

An example of a direct instruction is "Mark As Spent" as shown in I-cache 15 in FIG. 1. This instruction specifies one or more 32-bit sections of main memory. Upon execution of a "Mark As Spent" instruction, if there is a line section in data cache 17 corresponding to the specified memory section, it is marked "spent". Line L3 of data cache 17 represents the result of a "Mark As Spent" instruction after a prior status such as that shown for Line L2. If there is no corresponding section in data cache 17, there is no resulting change in cache status. The "Mark As Spent" instruction allows a number of sections to be indicated, in effect specifying a range of main-memory section addresses; to the extent the specified main-memory addresses are represented in data cache 17, they are marked "spent". The range need not be aligned with cache-line boundaries and can affect multiple cache lines at once.

Another example of a direct instruction is a "Read Last Time" instruction, represented in I-cache 15 in FIG. 1. This instruction specifies a single main-memory section. As in a conventional read instruction, the requested data is read from data cache 17 if the specified section is represented there, and copied from main-memory and then read from data cache 17 if the specified section is not represented in the cache. In either case, the corresponding section is marked "spent". In FIG. 1, line L4 shows the result of a "Read Last Time" instruction applied to section S2 of line L4, the previous state of which corresponds to that shown for Line L3.

Conditional instructions define a condition which, when met, will cause data to become spent. For example, a conditional instruction can specify that data be marked spent after the next time it is read. The conditional instructions are typically write instructions, so that the condition is specified as the data is written to cache. However, the invention provides for conditional instructions that apply to data previously written to cache.

An example of a conditional instruction is "Write As Read Once" as shown in instruction cache 15. The condition is met the next time the section written to is next read, as represented by the "Read Word" instruction in instruction cache 15. The result of executing a "Write as Read Once" instruction for a memory section represented in data cache 17 at cache line L5, section S4, is shown in FIG. 1., where the previous status of cache line L5 corresponds to that of either cache line L1 or cache line L2 as shown in FIG. 1. The result of a "Mark as Read Once" instruction for a single word at a specified main-memory section that is represented in cache as line L6, section S3 is shown in FIG. 1, for a cache line with a previous status as shown for line L5. The result of a "Mark as Read Once" instruction that specifies a series of sections is shown at cache line L7 where the prior status was as shown for any of cache lines L4-L6, and the range of main-memory section corresponds to sections S1-S4 of cache line L7.

Cache line L7 shows a cache line in which all sections have been marked "read once". Hence, all section status bits indicate "perishable" (P). Cache L8 shows a status in which all sections have been marked "read once" and one section S4 has been read. The status bits indicate three perishable sections and one spent section. Line L9 is like line L8 but with an additional read from section S3. Line LA and line LB are like line L9 but with additional reads respectively from sections S2 and S1. Alternatively, cache line LB could be arrived at using "Mark As Spent" instructions, as indicated above, or a combination of "Read" (of read-once data) and "Mark As Spent" instructions. Table I lists some of the instructions provided for by the invention.

TABLE I

Instructions For Specifying Spent Status

| Instruction [Operands] | Action |
| --- | --- |
| "Mark As Spent" [address, number of sections] | Marks "spent" all cache-line sections corresponding to the specified number of main-memory sections following the specified main-memory address. |
| "Read Last Time" [address] | Reads cache-line section corresponding to specified main memory section (unless a cache miss cause a read of the main-memory section) and marks the cache-line section "spent". |
| "Mark As Read Once" [address, number of sections] | Marks "read once" all cache-line sections corresponding to the specified number of main-memory sections following the specified main-memory address. Subsequently, when any of these cache-line sections (marked "read once") is read, it is marked "spent". |
| "Write As Read Once" [address] | Marks "read once" the cache-line section corresponding to the main-memory section at the specified main-memory address. Subsequently, when this cache-line section is read, it is marked "spent". |

Line LC shows a status arrived at from purging after it achieved the "all spent" status shown for line LB. The line is marked invalid and the rest of the status bits are meaningless. In the illustrated example, cache lines are invalidated as soon as all sections are marked "spent". In an alternative embodiment, fully spent cache lines retain validity until they are overwritten. In any case line LB is available for overwriting without being written back first to main memory.

Figure 2:
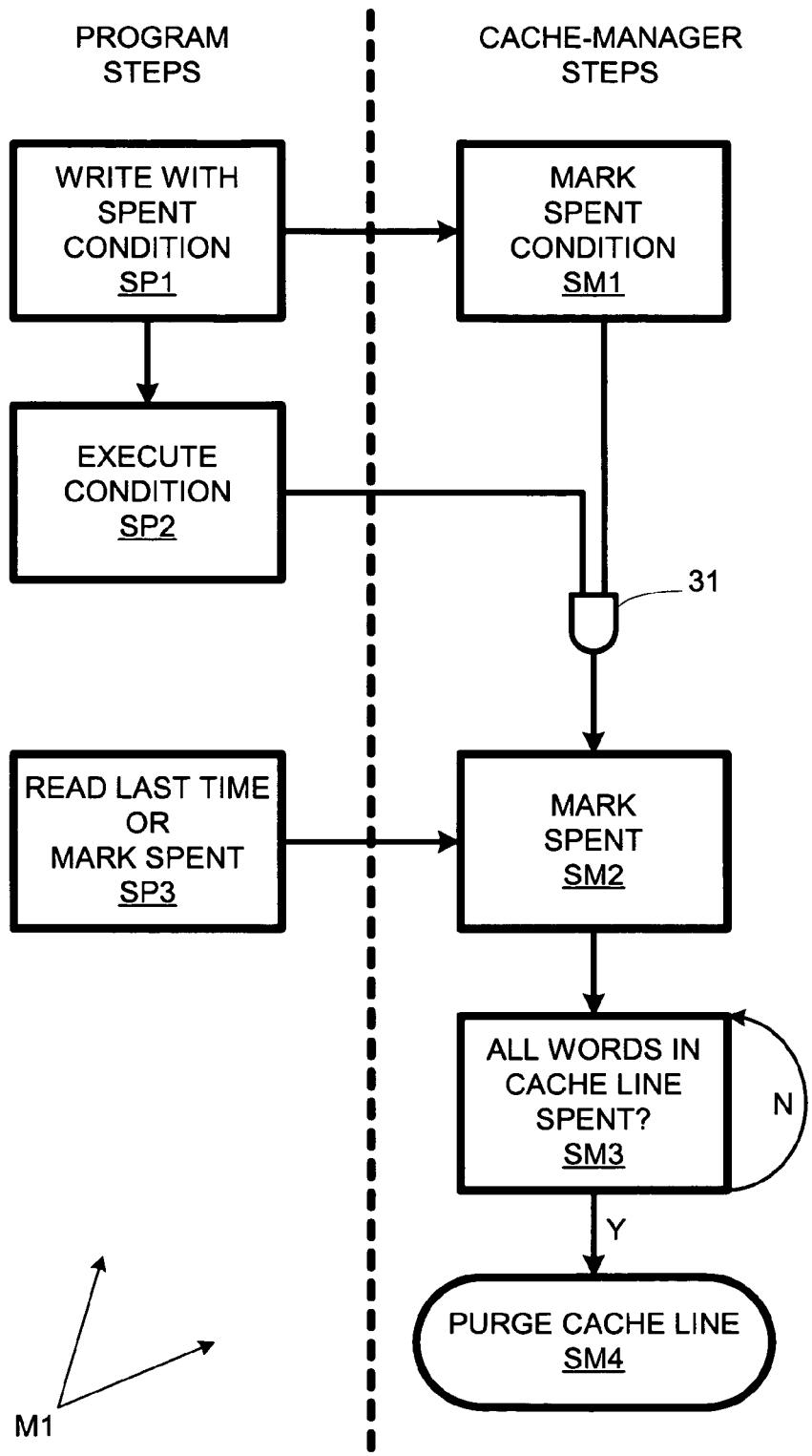
FIG. 2 is a flow chart of a method of the invention practiced in the context of the computer system of FIG. 1.

A method M1, as practiced in the system AP1 of FIG. 1, is flow charted in FIG. 2, which distinguishes between program-driven steps SP1-SP3 and cache-manager steps SM1-SM4. Program-driven step SP1 involves executing an instruction that specifies a condition for becoming spent. For example, the instruction can be a "Write As Read Once" instruction. Execution of this instruction causes cache manager 19 to mark the section written to with the condition for rendering the data contained therein as having spent status. (Herein, there is no practical difference from considering a section marked spent and considering the data therein marked spent.) For example, the condition can be that the data is spent upon the next read from the containing section.

Step SP2 involves executing an instruction that causes the condition to be met. This step can be a solitary step, as in the case of a read instruction when the data has been marked as read once. Alternatively, this step can be the last of several steps, as in the case of a fourth read instruction when the data is written as "read four times". As indicated by AND gate 31, execution of the final conditional step for a section that had been marked with a condition results in the section being marked "spent" at step SM2.

Step SM2 can also be reached directly from program-driven step SP3, which involves execution of an instruction that directly specifies that data be marked spent, e.g., the "Mark As Spent" instruction or the "Read Last Time" instruction. Each time a section of a cache line is marked spent, cache manager 19 checks, at step CM3, the cache line as a whole to determine if all sections have been marked spent. If they have not, nothing occurs. If they have, the line can be purged immediately or when required for overwriting at step CM4.

In system AP1, a line is invalidated once it is determined that all sections contain spent data. Invalidating the cache line, or otherwise making it more eligible for replacement than other valid cache lines, decreases the likelihood that useful data will be displaced from the cache—generally improving the hit rate. In an alternative embodiment, the spent cache line is not marked invalid, but is not written back whenever it is purged, e.g., so that it can be overwritten by more recently fetched data.

More generally, the invention provides embodiments in which some cache lines are purged immediately, e.g., by being marked "invalid", while others are only purged upon replacement. The status fields for an alternative cache 17B in a system that is otherwise comparable to system AP1 are shown in FIG. 3. In cache 17B, there are no line status bits, but four status bits per section. For each section, there is: a valid (V) bit that indicates whether the data in the section is valid (+) or invalid (−); a "modified" (M) bit that indicates whether the data in the section is modified (+) or unmodified (−); a "durable" bit indicating whether the data in the section is durable (+) or non-durable (−); and a "spent" bit indicating whether the data in the section is spent (+) or unspent (−). "Non-durable" encompasses both "spent" and "unspent", the latter being equivalent to "perishable" in FIG. 1. In FIG. 3, a blank cell indicates the value for the corresponding flag is meaningless, e.g., when a section has invalid data, the modified, durable, and spent flags are meaningless.

Line L1 of cache 17B shows a line in which all sections are marked valid, modified, non-durable, and spent; this line is invalidated as soon as the temporally last section is marked spent by marking all sections invalid as shown for line L2, which is thus given a high priority for overwriting. Line L3 shows a line in which the first three sections S1-S3 have spent data and the fourth section S4 is marked invalid; this line is immediately invalidated to the form of line L2. Since lines L1-L3 are invalid, new data can be written to them without write back.

Line L4 of cache 17B has sections S1-S3 containing spent data and section S4 containing valid unmodified durable data. A line with this status combination is not immediately invalidated as the unmodified durable data can still prove useful. However, if it is replaced, it will not be written back. Line L5 has sections S1-S3 containing spent data and section S4 containing valid unmodified perishable (unspent) data. This line is also not immediately invalidated because the unmodified perishable data may still need to be read. However, if it is replaced, it will not be written back. In line L6, section S1 contains spent modified data, section S2 is marked invalid, section S3 contains unmodified durable data, and section S4 contains unmodified nondurable unspent data. This line is not written back when it is replaced.

Line L7 of cache 17B has sections S1-S3 containing spent data and section S4 containing perishable modified data. Line L8 is similar except section S4 contains modified durable data. Both of these lines contain unspent modified data. Accordingly, both must be written back from cache 17B when they are replaced.

The invention provides for many alternative approaches to tracking line and section status. For example, in a system similar to that shown in FIG. 1, sections with modified durable data are distinguished from sections with unmodified durable data so there are four states represented with two bits per section: unmodified durable data, modified durable data, perishable data, and spent data. When a line is about to overwritten, write back can be skipped if the line sections contain only spent and unmodified durable data. If the line contains any modified data or perishable data, it is written back. In another embodiment, unmodified perishable data is distinguished from modified perishable data so that only lines with modified perishable or durable data are written back upon replacement.

There are many opportunities for a programmer or compiler to optimize code to take advantage of the invention. For example, a compiler can infer that an array has the read-once property by noting that the array is local to a procedure, occurs only once on the right-hand side in the procedure, and that the indexing expression used to reference the array is a one-to-one mapping from loop indices to array indices. Alternatively, the compiler may discover this by pointer analysis or another mechanism. Programmers can also annotate variables, indicating that they have the read-once property. The compiler can then generate appropriate machine code, using a mechanism supported in the instruction set to inform the cache that a line consists of read-once data.

The invention provides a combination of new cache features, instructions that exploit them, and software that together can suppress write and read traffic to and from memory. These can be used to avoid memory traffic for a stream of data that is produced in a processor and consumed a short time later by the same or another processor on the same processor chip. The data are routed through cache and never stored in main memory. By "a short time later" is meant soon enough that the set of live data that have been produced and not yet consumed can fit in the cache without overwriting before use due to capacity or conflict. They can also be used more generally, for example to suppress the write-back of variables known to be dead, such as out-of-scope automatic variables.

In a specific example of streaming, Phase 1 is a "for" loop that writes the elements of a one-dimensional array in first-to-last order:

for (k=1; k<100000; k++) a[k]=f(k);

Phase 2 consumes the data stream: it reads the elements of a in the same order:

for (j=1; j<100000; j++) . . . = . . . a[j];

If the program executes Phase 1 in its entirety before executing Phase 2, the data may have been written back through the levels of the cache hierarchy to main memory. By reorganizing the program, the programmer can make sure that the elements of the array "a" are read by Phase 2 soon after they are written by Phase 1 and so make it very likely that they are still resident in a cache local to the processor, and hence are more quickly available to Phase 2. For example, the programmer may decide to rewrite the program so that after Phase 1 produces 100 elements of the array "a", Phase 2 consumes them:

for (block=0; block<1000; block++) {
for (k=100*block; k<100*(block+1); k++) a[k]=f(k);
for (j=100*block; j<100*(block+1); j++) . . . = . . .
a[j] . . . ;
}

Alternatively, one can arrange for Phase 1 and Phase 2 to run in parallel, with Phase 2 lagging Phase 1 just enough that the data are produced by Phase 1 before they are consumed by Phase 2. By doing this kind of rescheduling, one can reduce the number of elements of the intermediate array that have been written by Phase 1 and not yet read by Phase 2. This sort of re-arrangement of work such that the working set of data produced by Phase 1 but not yet consumed by Phase 2 is reduced to a size that can be held in cache could also be done automatically by a compiler or by other program development tools.

Indeed, compilers do such rearrangements in order to reduce the size of the working set of an inner loop nest so as to enhance temporal locality and increase cache hit rates. If this kind of implementation is done on a machine with a conventional write-back cache, it can succeed in eliminating the reads of data from main memory by Phase 2—the cache supplies the data. However, the writes of the useless data to main memory are not eliminated. Each element of "a" is first written into a cache line which is marked as dirty (has more recent data than main memory). Before another cache line overwrites this line, it will be written back to memory.

In many cases, the programmer will know, or the compiler can determine, that Phase 2 is the only reader of the array "a". This array has a "read-once" character—the value of each element of the array will be loaded into a register at most once. In other words, between any two loads of any element of the array there will be an intervening store to that element. To make this determination in the compiler, modern data dependence techniques (involving the analysis of affine array index expressions and using analytical tools to decide on the existence of integer solutions to systems of linear inequalities and equations) can be extended to determine the liveness of array data.

When a cache line holding elements of a read-once array is overwritten, it is quite likely that the data in the cache line are "spent", meaning that they will not be referenced later in the program. This will happen in our example if all the reads from Phase 2 for the array elements in the cache line have occurred before the line is overwritten. So there may be lines in the cache that are modified but spent. In the present invention, the cache is aware of this, so instead of overwriting the line through a write-back to memory it simply invalidates the line, making the cache space available with no memory write.

The present invention provides for many alternatives to the embodiments described above. Instructions can specify individual sections or ranges of sections; the ranges can extend over multiple cache lines. As viewed herein, instructions that specify a range of sections also specify "a section", e.g., the first section of the range.

Instructions can specify a wide variety of conditions for data being considered spent. For example, the data can be read once, read n-times, equal to a constant such as zero, etc. The invention provides for purging without write-back when some but not all cache line sections contain spent data, as long as none contain unspent modified data. For example, some sections can include clean or invalid data instead of spent data. In these cases, additional flag bits may be required per section. Alternatively, a spent flag can have an additional meaning—for example, the flag value for spent can equal the flag value for invalid data.

The invention provides that at least one cache line in which all sections containing spent data be purged without being written back. However, it is within the scope of the invention to write back some cache lines including only spent data. There may be a variety of reasons for such apparently wasteful writes back, but these do not eliminate the performance advantage provided by the purges without writes back of spent data that are performed.

In one of its aspects, the invention provides a computer program that specifies a cache-line section containing data that is to acquire "spent" status. Preferably, the cache-line section is specified in terms of corresponding (logical or physical) main-memory locations with a cache manager associating memory sections with cache-line sections. Specifying spent data can require single instructions or a combination of two or more instructions. For example, a single instruction can specify that data contained in a cache section corresponding to a specified main-memory section is spent. Alternatively, the invention provides for a read instruction that marks the data read as spent.

The invention further provides for instructions that specify conditions under which data will acquire spent status. Advantageously, a write instruction can specify a condition which, when met, would render spent the data being written to cache; the condition would be met when subsequent instructions were executed. For example, the write instruction can specify the number of times data being written to cache is to be read. Once that data was read the specified number of times, the data would be deemed spent.

In another of its aspects, the invention provides a computer system including a cache and a cache manager. Preferably, the system includes an execution unit that executes a program that specifies which data is spent. The cache manager can identify cache lines and/or sections corresponding to the main-memory addresses specified by the program instructions. The cache manager further determines when a cache line meets the criterion for purging spent data. For example, a cache manager can inspect flags for each section of a cache line to determine if all sections of that line contain spent data (or other types of data not requiring write back), or it can count condition-related events to determine when purge criteria are met.

In yet another of its aspects, the invention provides a method of identifying spent data in accordance with program instructions, and determining when all sections of a cache line contain spent data. In addition, the invention provides for purging a cache line when at least one of its sections contains spent data and no section contains unspent modified data. The method accommodates both single-instructions that specify which data is spent and combinations of instructions that determine which data is spent and under what conditions. The method also provides for tracking spent data by cache-line section or simply counting down events to determine when a cache line as a whole meets the purge criterion.

The present invention allows some useless modified cached data to be distinguished from useful modified cached data in a manner not provided in the prior art. The invention then uses this distinction to eliminate some writes back required in the prior art and thus provides a corresponding performance improvement. The invention provides for this saving without requiring program knowledge of cache structure. Another advantage of the invention is it that can allow lines with useful data to be retained in the cache for longer than they would be if spent data were not tracked. For example, a conventional cache might overwrite the least-recently used cache line, even if it contained data that might be required in the future. The present invention would retain such a cache line as long as the space required for newly fetched data could be met by lines purged because they contained only spent data.

In the illustrated embodiment, the spent-versus-unspent status of each section is explicitly tracked. In some alternative embodiments, status is not tracked section by section. For example, an instruction can specify that all sections of a cache line hold read once data. A counter dedicated to the cache line can then be set to the number of sections and counted down each time the cache line is read from. A purge can occur once the count is zero. Alternatively, a counter can count up each time a section is specified as read once and counted down each time a section is read. Herein, even embodiments that track the status of individual sections "count" in the sense that the number of sections containing spent data can be read from the status bits. These and other modifications to and variations upon the illustrated embodiments are provided for by the present invention, the scope of which is defined by the following claims.

What is claimed is:

1. A system for providing to a processor copies of data in a memory having memory sections, said system comprising a cache, said cache having plural cache lines of plural cache-line sections each for containing data, each of said cache-line sections representing at most one respective memory section at any given time, said cache further including means for indicating for each of said cache-line sections whether or not it contains valid data having spent status, said cache including a cache manager for writing back to said memory a cache line containing modified valid data not having spent status and for purging a cache line having modified valid data having spent status without writing said cache line back to said memory.

2. A system as recited in claim 1 wherein said cache manager purges a cache line without writing back to said memory when all of its sections contain data having spent status.

3. A system as recited in claim 1 further comprising a cache manager that purges a cache line without writing back to said memory when at least one of its sections contains data having spent status and none of its sections contains modified data not having spent status.

4. A system as recited in claim 1 further comprising a cache manager that invalidates without writing back to said memory a cache line when at least one of its sections contains data having spent status and none of its sections contains valid data not having spent status.

5. A system as recited in claim 1 further comprising a cache manager that overwrites a cache line without writing back to said memory when at least one of its sections contains spent data, at least one of its sections contains unmodified data, and none of its sections contains modified data not having spent status.

6. A system as recited in claim 1 wherein said purging destroys the only up-to-date copies of data represented in said cache line.

7. A method comprising:
   executing a program of instructions that assigns spent status to data stored in cache-line sections;
   writing back to memory a cache line containing modified valid data not having spent status; and
   purging without writing back to said memory a cache line having at least one section containing modified valid data having spent status.

8. A method as recited in claim 7 further comprising flagging cache-line sections that contain spent data to determine when to purge said cache line.

9. A method as recited in claim 8 wherein said program contains an instruction that assigns a program-controlled condition to data stored in a cache-line section, said condition, when met, causing said data to acquire spent status.

10. A method as recited in claim 9 further comprising indicating that said cache-line section contains data having spent status when said condition is met.

11. A method as recited in claim 9 wherein said instruction is a write instruction causing data to be written to said cache.

12. A method as recited in claim 9 wherein said instruction specifies that data acquire spent status after being read a certain number of times.

13. A method as recited in claim 9 further comprising counting the number of cache-line sections of a cache line that contain spent data to determine when to purge that cache line.

14. A method as recited in claim 7 wherein said purging of a cache line can occur when at least one of its sections contains spent and none of its sections contains unspent modified data.

15. A method as recited in claim 7 wherein said cache-line sections are specified by said program in terms of memory sections they represent 16. A method as recited in claim 15 wherein said program includes an instruction that assigns spent status to data contained in at least one cache-line section.

17. A method as recited in claim 7 further wherein said purging involves invalidating a cache line once all of its sections contain data having spent status.

18. Computer readable media comprising a program of instructions that, when executed, changes the contents of status fields of a write-back cache to indicate whether or not a cache line containing modified valid data is to be written back to memory before being purged.

19. Computer readable media as recited in claim 18 wherein a cache-line section is specified by said program in terms of a memory section it represents.

20. Computer readable media as recited in claim 19 wherein said program includes an instruction that assigns spent status to data stored in one or more cache-line sections, said cache-line sections being specified by said program in terms of the memory sections they represent.

21. Computer readable media as recited in claim 20 wherein said instruction is a mark-as-spent instruction.

22. Computer readable media as recited in claim 20 wherein said instruction is a read-last-time instruction.

23. Computer readable media as recited in claim 19 wherein said program includes an instruction that assigns a program-controlled condition to data contained in a cache-line section, said condition, when met, causing said data to acquire spent status, said cache-line section being specified by said instruction in terms of the memory section it represents.

24. Computer readable media as recited in claim 23 wherein said instruction is a write-as-read-once instruction that specifies that the data written thereby is to be considered spent once it is read in accordance with another instruction.

25. Computer readable media as recited in claim 23 wherein said instruction is a mark-as-read-once instruction that specifies that the data referred to thereby is to be considered spent once it is read in accordance with another instruction.

26. A computer system comprising:
   a cache with plural cache lines of plural cache-line sections each for containing data, said cache further including means for indicating for each of said cache lines how many of its sections contain valid data having spent status, each of said cache-line sections representing at most one respective memory section at any given time; and
   a cache manager that purges without writing back to memory a cache line when all of its cache-line sections contain data having spent status and that writes back prior to purging a cache line containing modified valid unspent data.

27. A computer system as recited in claim 26 wherein said cache manager flags cache-line sections containing data having spent status.

28. A computer system as recited in claim 26 wherein said cache manager purges said cache line when at least one of its sections contains data having spent status and none of its sections contains data having unspent modified status.

29. A computer system as recited in claim 26 further comprising an execution unit for executing a program of instructions that assigns a spent status to data stored in a cache-line section.

30. A computer system as recited in claim 29 wherein:
   each of said cache-line sections represents at most one respective memory section at any given time; and
   said cache-line section is specified by said program in terms of the memory section it represents.

31. A computer system as recited in claim 30 wherein said program includes an instruction that assigns spent status to data contained in a cache-line section, said cache-line section being specified by said instruction in terms of the memory section it represents.

32. A computer system as recited in claim 30 wherein said program includes an instruction that assigns a program-controlled condition to data stored in a cache-line section, said condition, when met, causing said data to acquire spent status, said cache-line section being specified by said instruction in terms of the memory section it represents.

33. A computer system as recited in claim 32 wherein said cache manager indicates that a cache-line section contains data having spent status when said condition is met.

34. A computer system as recited in claim 32 wherein said instruction is a write instruction causing said data to be written to said cache-line section.

35. A computer system as recited in claim 32 wherein said instruction specifies that data is to acquire spent status after being read a specified number of times.

36. A system for providing to a processor copies of data in a cache having plural cache lines for containing data, said cache further including means for indicating for each of said cache lines whether or not it contains valid data having spent status.

* * * * *

UNITED STATES PATENT AND TRADEMARK OFFICE
CERTIFICATE OF CORRECTION

| | | |
|---|---|---|
| PATENT NO. | : 8,214,601 B2 | |
| APPLICATION NO. | : 10/909057 | |
| DATED | : July 3, 2012 | |
| INVENTOR(S) | : Dale Morris et al. | |

It is certified that error appears in the above-identified patent and that said Letters Patent is hereby corrected as shown below:

In the Claims:

In column 10, line 13, in Claim 15, delete "represent" and insert -- represent. --, therefor.

Signed and Sealed this
First Day of January, 2013

David J. Kappos
*Director of the United States Patent and Trademark Office*